United States Patent
Hashizume et al.

(10) Patent No.: US 9,577,819 B2
(45) Date of Patent: Feb. 21, 2017

(54) COMMUNICATION DEVICE, PULSE SIGNAL DELAY ADJUSTMENT METHOD AND COMMUNICATION SYSTEM

(71) Applicant: FUJITSU LIMITED, Kawasaki-shi, Kanagawa (JP)

(72) Inventors: Masato Hashizume, Souraku (JP); Hisanori Okano, Moriguchi (JP); Yasuo Takami, Kawachinagano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/921,422

(22) Filed: Oct. 23, 2015

(65) Prior Publication Data

US 2016/0182217 A1 Jun. 23, 2016

(30) Foreign Application Priority Data

Dec. 18, 2014 (JP) ................................ 2014-256610

(51) Int. Cl.
*H04L 7/00* (2006.01)
*H04B 17/364* (2015.01)

(52) U.S. Cl.
CPC ........... *H04L 7/0041* (2013.01); *H04B 17/364* (2015.01)

(58) Field of Classification Search
CPC ........ H04L 7/0008; H04L 7/02; H04L 7/0331; H04L 7/0337; H04L 7/033
USPC .................................. 375/354, 219, 295, 316
See application file for complete search history.

(56) References Cited

U.S. PATENT DOCUMENTS

2009/0015304 A1* 1/2009 Yin ........................... H03L 7/06
                                                                 327/162
2014/0010317 A1* 1/2014 Oshikiri ................ H04L 7/0012
                                                                 375/259

FOREIGN PATENT DOCUMENTS

JP          11-225173         8/1999
JP          11-355258         12/1999

* cited by examiner

*Primary Examiner* — Zewdu Kassa
(74) *Attorney, Agent, or Firm* — Staas & Halsey LLP

(57) ABSTRACT

A communication device includes a reception buffer configured to receive a pulse signal cyclically transmitted from a transmission source device via a transmission line; a branch circuit configured to generate a branch pulse signal by branching the pulse signal; a delay circuit configured to add a predetermined delay time to the generated branch pulse signal; and a transmission buffer configured to transmit the branch pulse signal to which the predetermined delay time was added to the transmission source device via the transmission line.

20 Claims, 12 Drawing Sheets

COMMUNICATION DEVICE, PULSE SIGNAL DELAY ADJUSTMENT METHOD AND COMMUNICATION SYSTEM

CROSS-REFERENCE TO RELATED APPLICATION

This application is based upon and claims the benefit of priority of the prior Japanese Patent Application No. 2014-256610, filed on Dec. 18, 2014, the entire contents of which are incorporated herein by reference.

FIELD

The embodiments discussed herein are related to a communication device, a pulse signal delay adjustment method and a communication system.

BACKGROUND

In a method for performing highly precise time synchronization between communication equipments, for example, a precision time protocol (PTP) is used. When such a time synchronization method is employed, a plurality of line interface cards mounted in a single transmission device operates in synchronization with a common reference timing. Therefore, a pulse signal generated in a common timing generation card is cyclically transmitted to each of the line interface cards via a back wired board (BWB), which is a wiring substrate.

Regarding signal transmission between devices, for example, Japanese Laid-open Patent Publication No. 11-225173 describes a point that a signal is returned to a transmission path at a reception side to calculate a transmission delay of the signal and delay adjustment is performed.

As a method for synchronizing reception timings of pulse signals among the plurality of line interface cards, for example, a method in which the wiring length of the BWB is made the same between the timing generation card and each of the line interface cards may be used. However, in the BWB, in order to wire signal lines such that each of signal lines for pulse signals avoids other signal lines and the signal lines of pulse signals have the same wiring length, for example, the number of layers of a substrate of the BWB is increased. This causes increase in device cost.

Instead of using the method above, a method in which a transmission delay between the timing generation card and each of the line interface cards is measured and a delay of a corresponding pulse signal is individually adjusted in accordance with a measured value obtained in the measurement may be used. Using this method, synchronization of reception timings of pulse signals is realized without increasing the device cost.

However, assuming a case where techniques described in Japanese Laid-open Patent Publication No. 11-225173 is employed, when a signal is returned at a tip of a transmission line, a delay time of a signal, which is generated by a delay adjustment buffer, is unknown. Therefore, precise delay adjustment is not possible.

SUMMARY

According to an aspect of the invention, a communication device includes a reception buffer configured to receive a pulse signal cyclically transmitted from a transmission source device via a transmission line; a branch circuit configured to generate a branch pulse signal by branching the pulse signal; a delay circuit configured to add a predetermined delay time to the generated branch pulse signal; and a transmission buffer configured to transmit the branch pulse signal to which the predetermined delay time was added to the transmission source device via the transmission line.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Figure 1:
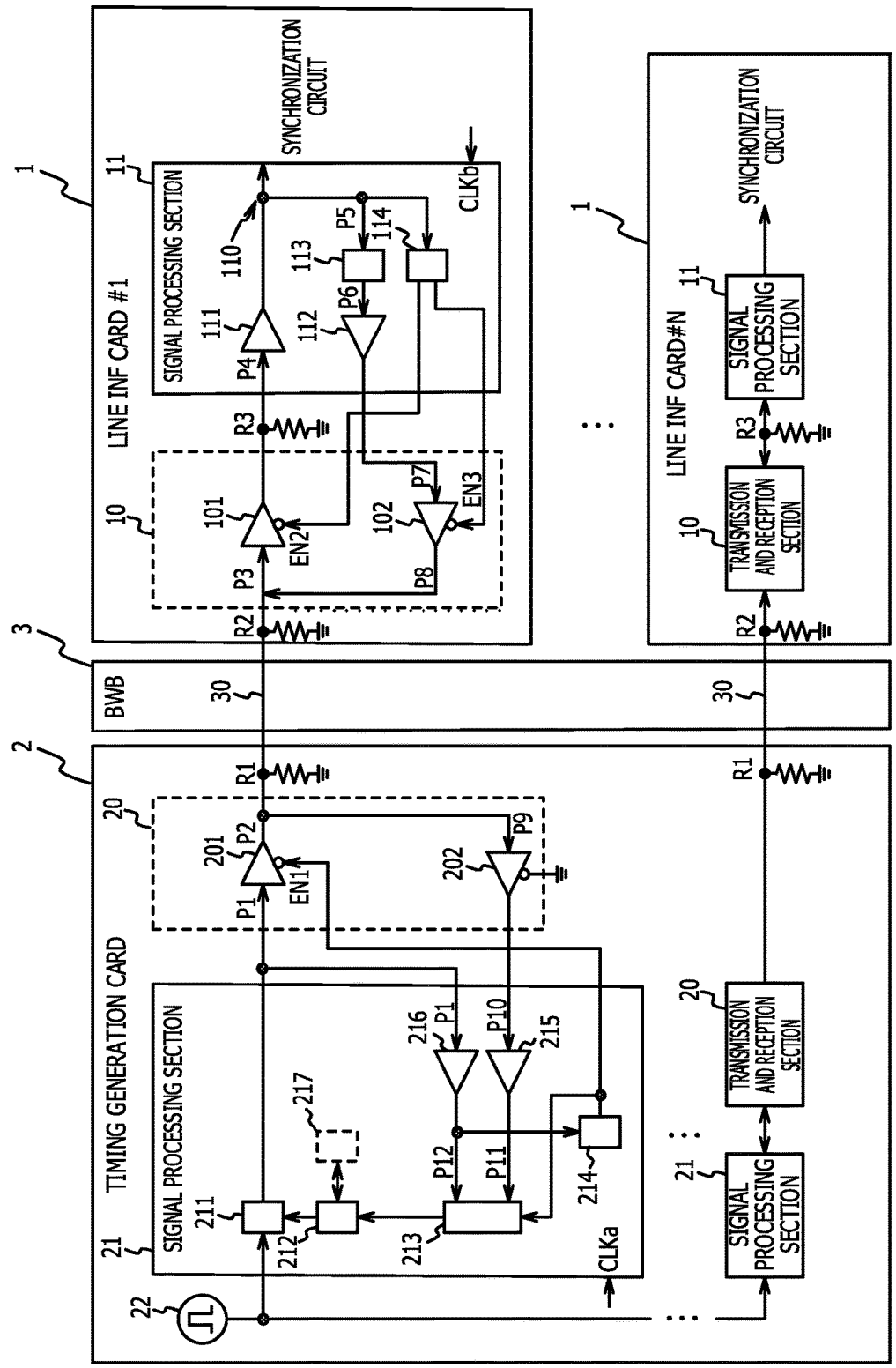
FIG. 1 is a configuration diagram illustrating a transmission device according to a first embodiment.

FIG. 1 is a configuration diagram illustrating a transmission device according to a first embodiment. The transmission device includes a plurality of line interface (INF) cards (#1 to #N where N is a positive integer) 1, a timing generation card 2, and a BWB 3, which is a wiring substrate.

The timing generation card 2 is an example of the first communication device. The timing generation card 2 cyclically generates a pulse signal and transmits generated pulse signals to the line interface cards 1 in order to perform, for example, based on the PTP, or the like, time synchronization between the timing generation card 2 and each of the line interface cards 1. The line interface cards 1 are an example of the second communication device. The line interface cards 1 perform processing of communication lines between the line interface cards 1 and other transmission devices. Each of the line interface cards 1 performs processing of the corresponding one of the communication lines in synchronization with the common reference timing based on a received pulse signal.

The line interface cards 1 and the timing generation card 2 are, for example, electronic circuit boards on which electronic components are mounted, and are inserted in a slot provided in a front surface of a case of the transmission device. The BWB 3 is provided, for example, in a back surface of the case, and is electrically coupled to each of the line interface cards 1 and the timing generation card 2 via an electric connector. Thus, the line interface cards 1 and the timing generation card 2 are enabled to transmit and receive pulse signals via wirings 30 in the BWB 3.

The timing generation card 2 includes a plurality of transmission and reception sections 20, a plurality of signal processing sections 21, a pulse signal source 22, and a plurality of pull-down resistors R1, which are grounded. The transmission and reception sections 20, the signal processing sections 21, and the pull-down resistors R1 are provided such that one transmission and reception section 20, one signal processing section 21, and one pull-down resistor R1 are provided for each of the line interface cards 1. In FIG. 1, only configurations of the transmission and reception section 20 and the signal processing section 21 which correspond to one (the line interface card #1) of the line interface cards 1 are illustrated. However, the transmission and reception sections 20 and the signal processing sections 21 which correspond to the other ones (the line interface cards #2 to #N) of the line interface cards 1 have similar configurations to the illustrated configurations.

The pulse signal source 22 cyclically generates a pulse signal and outputs generated pulse signals to the signal processing sections 21. In this embodiment, as an example, a cycle of the pulse signal is 2 KHz, the pulse signal has a width corresponding to one 38.88 MHz clock. The form of the pulse signal is a HIGH pulse that rises at a front part and falls at a rear part. However, as will be described later, the form of the pulse signal may be a LOW pulse that falls at the front part and rises at the rear part.

Each of the signal processing sections 21 of the timing generation card 2 measures a transmission delay of a pulse signal transmitted to the corresponding one of the line interface cards 1 and performs delay adjustment of the pulse signal, based on a measurement result. Thus, reception timings of pulse signals among the plurality of line interface cards 1 are synchronized with one another.

The signal processing section 21 is formed by, for example, a field programmable gate array (FPGA). The signal processing section 21 includes a variable delay section 211, a delay amount calculation section 212, a phase difference detection section 213, a control section 214, input buffers 215 and 216, and a statistical processing section 217. The statistical processing section 217 may be formed by a software, or the like, which operates outside the FPGA.

The signal processing section 21 operates in synchronization with a clock signal CLKa input from an external oscillator or the like. The frequency of the clock signal CLKa is, for example, 1 GHz, but is not limited thereto. The clock signal CLKa is not limited to an input signal from the outside, and may be a signal generated by a multiplier circuit in the signal processing section 21.

The variable delay section 211 adjusts a delay of a pulse signal input from the pulse signal source 22. More specifically, the variable delay section 211 gives a delay adjustment time set based on a result of transmission delay measurement from the delay amount calculation section 212 to the pulse signal. As will be describe later, transmission delay measurement is executed at all times during an operation. Thus, an optimal delay adjustment time is given to the pulse signal in accordance with an environment change due to age-related deterioration of a transmission buffer, a reception buffer, and the like, a temperature, a humidity, and the like. The pulse signal delayed in the variable delay section 211 is input to the corresponding transmission and reception section 20 and the corresponding input buffer 216.

The input buffer 216 outputs the pulse signal input from the variable delay section 211 to the control section 214 and the phase difference detection section 213. Thus, the phase difference detection section 213 detects transmission of the pulse signal.

The transmission and reception section 20 is formed by, for example, a three-state buffer. The transmission and reception section 20 includes a transmission buffer 201 and a reception buffer 202. The transmission buffer 201 transmits the pulse signal input from the variable delay section 211 to the line interface card 1 via the corresponding one of the wirings 30 of the BWB 3. The reception buffer 202 receives the pulse signal looped back from the line interface card 1 via the wiring 30 of the BWB 3.

The wiring 30 is an example of the transmission line through which the pulse signal is transmitted. The transmission buffer 201 and the reception buffer 202 may be configured so as to be capable of being coupled and decoupled to and from the wiring 30 by, for example, a switch, when the timing generation card 2 is not compliant with a hot plug corresponding to the BWB 3, in order to not to cause an influence on the pulse signal.

The transmission buffer 201 executes or stops transmission processing in accordance with a control signal EN1 input from the control section 214. The control signal EN1 is, for example, a negative logic (LOW active) enable signal. The control signal EN1 is input to a control terminal of the transmission buffer 201.

The transmission buffer 201 stops, when the control signal EN1 is "1" (HIGH), transmission processing, and executes, when the control signal EN1 is "0" (LOW), transmission processing. While transmission processing is stopped, an output of the transmission buffer 201 is high impedance. However, since the pull-down resistor R1 is coupled to a subsequent stage of an output terminal of the transmission buffer 201, the potential of the wiring 30 coupled to the transmission buffer 201 is fixed to a low potential (LOW). Therefore, the pulse signal received in the line interface card 1 is not influenced.

On the other hand, the reception buffer 202 is different from the transmission buffer 201 in that a control terminal thereof is grounded. Thus, the reception buffer 202 executes pulse signal reception processing at all times. The reception buffer 202 outputs a received pulse signal to the input buffer 215.

The control section 214 outputs the control signal EN1 to the transmission buffer 201 and the phase difference detection section 213. When the control section 214 detects a falling edge of a pulse signal input from the variable delay section 211 via the input buffer 216, the control section 214 switches the value of the control signal EN1 from "0" to "1". Thus, when the pulse signal transmitted to the line interface card 1 is looped back, the pulse signal is not input to the transmission buffer 201 but is input to the reception buffer 202.

The input buffer 215 outputs the pulse signal input from the reception buffer 202 to the phase difference detection section 213. Thus, the phase difference detection section 213 detects reception of the pulse signal that was looped back.

The phase difference detection section 213 detects a phase difference between the pulse signal transmitted by the timing generation card 2 and the pulse signal looped back from the line interface card 1. The detected phase difference is output to the delay amount calculation section 212.

The delay amount calculation section 212 calculates a transmission delay time from the phase difference detected by the phase difference detection section 213. The delay amount calculation section 212 calculates a difference between the calculated transmission delay time and a predetermined reference value, and sets a result of the calculation as a delay adjustment time in the variable delay section 211. Thus, a transmission delay between the timing generation card 2 and each of the line interface cards 1 is caused to accord with a common reference value.

The statistical processing section 217 reduces an error of the transmission delay time calculated by the delay amount calculation section 212 through statistical processing. The statistical processing section 217 may be formed by, for example, a processor, such as a central processing unit (CPU), and the like, driven by a software. There may be cases where, when the error of the transmission delay time falls in an allowable range, statistical processing is not performed.

Each of the line interface cards 1 includes a transmission and reception section 10, a signal processing section 11, and pull-down resistors R2 and R3. The line interface card 1 branches the pulse signal received from the timing generation card 2, and loops back a pulse signal (which will be hereinafter referred to as a "branch pulse signal") into which the pulse signal is branched to the timing generation card 2. As has been described above, the timing generation card 2 measures a transmission delay time, based on the branch pulse signal. The pulse signal, which is a branch source, is used in time synchronization processing in a synchronization circuit provided in a subsequent stage of the signal processing section 11.

The transmission and reception section 10 is formed by, for example, a three-state buffer. The transmission and reception section 10 includes a transmission buffer 102 and a reception buffer 101. The reception buffer 101 is an example of the reception section. The reception buffer 101 receives a pulse signal cyclically transmitted from the timing generation card 2 via the wiring 30 of the BWB 3. The reception buffer 101 includes a control terminal. The reception buffer 101 executes or stops reception processing in accordance with a control signal EN2 input from the signal processing section 11. The received pulse signal is output to the signal processing section 11.

The transmission buffer 102 is an example of the transmission section. The transmission buffer 102 transmits the branch pulse signal input from the signal processing section 11 to the timing generation card 2 via the wiring 30 of the BWB 3. The transmission buffer 102 includes a control terminal. The transmission buffer 102 executes or stops transmission processing in accordance with a control signal EN3 input from the signal processing section 11. The control signals EN2 and EN3 are, for example, negative logic (LOW active) enable signals.

The signal processing section 11 branches the pulse signal received from the timing generation card 2. In order to ensure a time for controlling the transmission and reception section 10, the signal processing section 11 gives a predetermined delay time to the branch pulse signal transmitted to the timing generation card 2. The signal processing section 11 is formed by, for example, an FPGA. The signal processing section 11 includes a branch section 110 configured to branch a pulse signal, an input buffer 111, an output buffer 112, a delay section 113, and a control section 114.

The signal processing section 11 operates in synchronization with a clock signal CLKb input from an external oscillator or the like. The frequency of the clock signal CLKb is the same as that of the clock signal CLKa. The clock signals CLKa and CLKb are preferably synchronized, depending on a sampling error caused when the phase difference detection section 213 detects a phase difference. The clock signal CLKb is not limited to an input signal from the outside. The clock signal CLKb may be a signal generated by the multiplier circuit in the signal processing section 11.

The input buffer 111 outputs the pulse signal input from the reception buffer 101 to the branch section 110. The branch section 110 is formed by, for example, two branched signal lines. The branch section 110 branches the pulse signal received by the reception buffer 101. A branch pulse signal obtained by branching the pulse signal is input to the delay section 113 and the control section 114. As described above, the pulse signal, which is a branch source, is output to the synchronization circuit in the subsequent stage and is used in time synchronization processing.

The control section 114 controls permission and rejection of transmission processing of the transmission buffer 102 and permission and rejection of reception processing of the reception buffer 101 in response to the branch pulse signal input from the branch section 110. The control section 114 transmits the control signal EN3 to the transmission buffer 102 and transmits the control signal EN2 to the reception buffer 101 to control transmission processing of the transmission buffer 102 and reception processing of the reception buffer 101.

When the control signal EN2 is "1" (HIGH), the reception buffer 101 stops reception processing. When the control signal EN2 is "0" (LOW), the reception buffer 101 executes reception processing. While reception processing is stopped, an output of the reception buffer 101 is high impedance. However, since a pull-down resistor R3 is coupled to a subsequent stage of an output terminal of the reception buffer 101, the potential of the output terminal of the reception buffer 101 is fixed to a low potential (LOW). Therefore, the pulse signal processed in the line interface card 1 is not influenced.

When the control signal EN3 is "1" (HIGH), the transmission buffer 102 stops transmission processing. When the control signal EN3 is "0" (LOW), the transmission buffer 102 executes transmission processing. While transmission processing is stopped, an output of the transmission buffer 102 is high impedance. However, since a pull-down resistor R2 is coupled to a subsequent stage of an output terminal of the transmission buffer 102, the potential of the output terminal of the wiring 30 coupled to the transmission buffer 102 is fixed to a low potential (LOW). Therefore, the pulse signal processed in the line interface card 1 is not influenced.

When the control section 114 detects a rear edge of the branch pulse signal, the control section 114 rejects reception processing of the reception buffer 101 and permits transmission processing of the transmission buffer 102. More specifically, when the control section 114 detects a falling edge of the branch pulse signal input from the branch section 110, the control section 114 switches the value of the control signal EN2 from "0" to "1", and switches the value of the control signal EN3 from "1" to "0". Thus, the transmission buffer 102 is put in a state where the transmission buffer 102 may transmit the branch pulse signal, and the reception buffer 101 is put in a state where the reception buffer 101 may not receive the pulse signal. As described above, the control section 114 performs control of input and output direction of the transmission and reception section 10.

Therefore, the branch pulse signal transmitted from the transmission buffer 102 is not input to the reception buffer 101, but is input to the reception buffer 202 of the timing generation card 2 via the wiring 30 of the BWB 3. The transmission buffer 102 and the reception buffer 101 may be configured so as to be capable of being coupled and decoupled to and from the wiring 30, for example, by a switch, when the timing generation card 2 is not compliant with a hot plug corresponding to the BWB 3, in order to not to cause an influence on the pulse signal.

Before the transmission buffer 102 transmits a branch pulse signal, the delay section 113 gives the predetermined delay time to the branch pulse signal. Thus, the line interface card 1 may ensure a time which it takes for the transmission buffer 102 to be in a state where the transmission buffer 102 may transmit the branch pulse signal. That is, a time which it takes for the control section 114 to complete control of the input and output direction of the transmission and reception section 10. The branch pulse signal delayed by the delay section 113 is input to the output buffer 112.

The output buffer 112 outputs the branch pulse signal input from the delay section 113 to the transmission buffer 102. Thus, the branch pulse signal is transmitted to the timing generation card 2.

The delay section 113 gives the predetermined delay time to the branch pulse signal in a range in which the branch pulse signal may reach the timing generation card 2 before a time when a next pulse signal is transmitted from the timing generation card 2. Therefore, even when the branch pulse signal is transmitted after the predetermined delay time was given, the branch pulse signal may reach the timing generation card 2 before the time when the next pulse signal is transmitted from the timing generation card 2. Thus, collision of the branch pulse signal with the next pulse signal on the wiring 30 of the BWB 3 is not caused. Therefore, even while the pulse signal is cyclically transmitted from the timing generation card 2, delay adjustment may be performed.

The timing generation card 2 measures a transmission delay from a time when the pulse signal was transmitted to the line interface card 1, a time when the branch pulse signal arrived, and the predetermined delay time. In the timing generation card 2, as described above, the phase difference detection section 213 detects a phase difference between the transmitted pulse signal and the received branch pulse signal. The delay amount calculation section 212 calculates a delay adjustment time that is to be set in the variable delay section 211 by subtracting the predetermined delay time given in the delay section 113 from the detected phase difference and then dividing a result of the subtraction by 2. Details of an operation of a transmission device according to this embodiment will be described.

Figure 2:
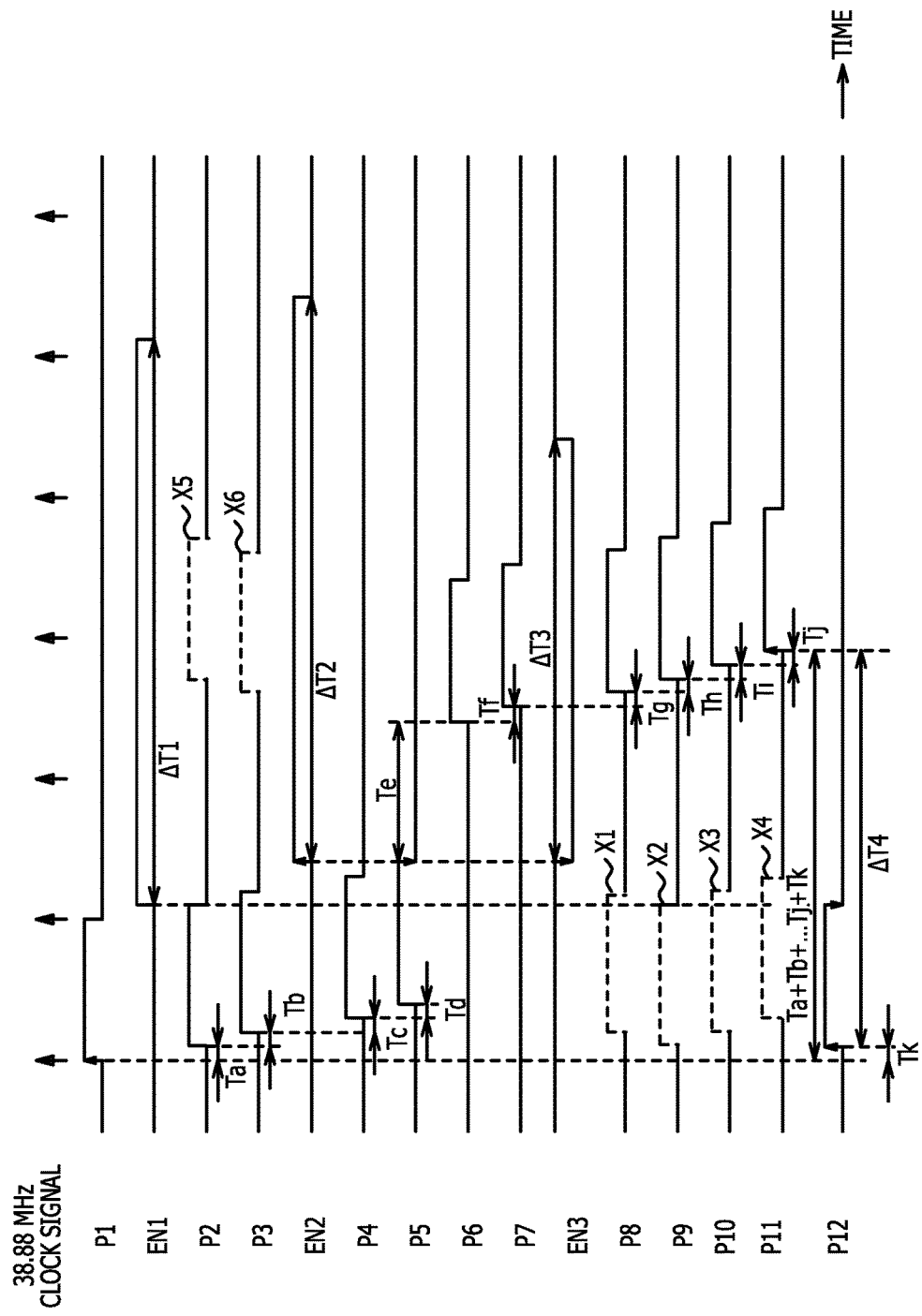
FIG. 2 is a time chart illustrating an example of an operation of the transmission device according to the first embodiment.

FIG. 2 is a time chart illustrating an example of an operation of the transmission device according to the first embodiment. Waveforms P1 to P12 represent respective waveforms of pulse signals denoted by the reference characters P1 to P12 in FIG. 1. In FIG. 2, as a reference of the width of a pulse signal, a rising edge of a 38.88 MHz clock signal is illustrated.

As indicated by the waveform P1, the pulse signal output from the variable delay section 211 is input to the transmission buffer 201. As indicated by the waveform P2, the pulse signal input to the transmission buffer 201 is delayed only by a propagation delay time Ta in the transmission buffer 201 and is thus output to the wiring 30 of the BWB 3. The pulse signal output from the variable delay section 211 is returned to the input buffer 216, as indicated by the waveform P12, is delayed only by a propagation delay time Tk in the input buffer 216, and is thus input to the phase difference detection section 213 and the control section 214.

The control section 214 detects a falling edge of the pulse signal input from the input buffer 216 with the clock signal CLKa. When the control section 214 detects the falling edge of the pulse signal, the control section 214 causes the control signal EN1 to be "1" only for a predetermined time ΔT1. The predetermined time ΔT1 is, for example, a time width corresponding to four 38.88 MHz clocks, but is not limited thereto.

Thus, the branch pulse signal looped back from the line interface card 1 is not input to the transmission buffer 201 but is input to the reception buffer 202. The control section 214 may be configured to cause the control signal EN1 to be back to "0" by detecting that the branch pulse signal is input to the reception buffer 202.

As denoted by the reference character X2 of the waveform P9, the pulse signal output from the transmission buffer 201 is returned to the reception buffer 202 before the pull-down resistor R1. As denoted by the reference character X3 of the waveform P10, the returned pulse signal is input to the input buffer 215, and then, as denoted by the reference character X4 of the waveform P11, is input to the phase difference detection section 213.

However, only when the control signal EN1 is "1", the phase difference detection section 213 detects the pulse signal. Thus, there is no longer a case where, based on the pulse signal returned in the timing generation card 2, a wrong propagation delay time is obtained.

As indicated by the waveform P3, the pulse signal output from the transmission buffer 201 is delayed only by a propagation delay time Tb of the wiring 30 and is thus input to the reception buffer 101 of the line interface card 1. Along with that, as denoted by the reference character X1 of the waveform P8, the pulse signal output from the transmission buffer 201 is also input to the output terminal of the transmission buffer 102. However, because the control signal EN3 is "1", even when the pulse signal is input from the output terminal, the transmission buffer 102 is not damaged.

As indicated by the waveform P4, the pulse signal input to the reception buffer 101 is delayed only by a propagation delay time Tc in the reception buffer 101 and is thus output to the input buffer 111. As indicated by the waveform P5, the pulse signal, which was input to the input buffer 111, is delayed only by a propagation delay time Td in the input buffer 111, and is thus output to the 113 and the 114. At this time, the pulse signal is branched into two by the branch section 110.

As indicated by the waveforms P5 and P6, when the delay section 113 detects a falling edge of the branch pulse signal, the delay section 113 gives a predetermined delay time Te to the branch pulse signal. Thus, the branch pulse signal is delayed only by the predetermined delay time Te and is thus output to the output buffer 112. At this time, the delay section 113 counts the delay time Te, based on the clock signal CLKb. The delay time Te has, for example, a time width corresponding to one 38.88 MHz clock, but is not limited thereto.

As indicated by the waveform P7, the branch pulse signal input to the output buffer 112 is delayed only by a propagation delay time Tf in the output buffer 112 and is thus output to the transmission buffer 102. At this time, the transmission buffer 102 is controlled by the control section 114 such that the control signal EN3 is "0". Thus, it is allowed to output the branch pulse signal to the wiring 30 of the BWB 3.

When the control section 114 detects a falling edge of the branch pulse signal input from the branch section 110, the control section 114 causes the control signal EN2 to be "1" only for a predetermined time ΔT2 and the control signal EN3 to be "0" only for a predetermined time ΔT3. Thus, the transmission buffer 102 executes transmission processing, and the reception buffer 101 stops reception processing. At this time, the predetermined time ΔT2 has, for example, a time width corresponding to four 38.88 MHz clocks, and the predetermined time ΔT3 has, for example, a time width corresponding to three 38.88 MHz clocks, but the predetermined times ΔT2 and ΔT3 are not limited thereto.

As described above, the control section 114 controls permission and rejection of transmission processing of the transmission buffer 102 and permission and rejection of reception processing of the reception buffer 101 in response to the branch pulse signal input from the branch section 110. When the control section 114 detects a falling edge of the branch pulse signal, the control section 114 rejects reception processing of the reception buffer 101 and permits transmission processing of the transmission buffer 102.

Thus, the branch pulse signal is output to the wiring 30 of the BWB 3 from the transmission buffer 102. As denoted by the reference character X6 of the waveform P3, the branch pulse signal output from the transmission buffer 102 is returned to the reception buffer 101. However, because the control signal EN2 is "1", the returned branch pulse signal is not input to the reception buffer 101. Therefore, transmission of the branch pulse signal does not influence pulse signal processing in the synchronization circuit in the subsequent stage from the signal processing section 11.

The control section 114 rejects reception processing of the reception buffer 101, and then, after the predetermined time ΔT2 has elapsed since the rejection, permits reception processing of the reception buffer 101. Then, the control section 114 permits transmission processing of the transmission buffer 102, and then, after the predetermined time ΔT3 has elapsed since the permission, rejects transmission processing of the transmission buffer 102. Thus, after the branch pulse signal is transmitted to the timing generation card 2 and before the next pulse signal arrives from the timing generation card 2, the reception buffer 101 is put in a state where the reception buffer 101 may receive a pulse signal. The control section 114 may cause the control signal EN2 to be back to "0" and the control signal EN3 to be back to "1", based on a time when the branch pulse signal was transmitted from the transmission buffer 102.

As indicated by the waveform P9, the branch pulse signal output from the transmission buffer 102 is delayed only by a propagation delay time Tg of the wirings 30 and is thus input to the reception buffer 202 of the timing generation card 2. As denoted by the reference character X5 of the waveform P2, the branch pulse signal output from the transmission buffer 102 is also input to the output terminal of the transmission buffer 201 of the timing generation card 2. However, because the control signal EN1 is "1", even when the pulse signal is input from the output terminal, the transmission buffer 201 is not damaged.

As indicated by the waveform P10, the branch pulse signal input to the reception buffer 202 is delayed only by a propagation delay time Th in the reception buffer 202 and is thus output to the input buffer 215. Furthermore, as indicated by the waveform P11, the branch pulse signal input to the input buffer 215 is delayed by only a propagation delay time Ti in the input buffer 215 and is thus output to the phase difference detection section 213.

The phase difference detection section 213 executes counting, based on the clock signal CLKa, and thus, detects a phase difference ΔT4 between a rising edge of the waveform P12 and a rising edge of the waveform P11. The phase difference ΔT4 is a value (that is, Ta+Tb+ . . . +Tj−Tk) obtained by subtracting the propagation delay time Tk of the input buffer 216 from the total of the propagation delay times Ta to Td, Tf to Tk, and the delay time Te. That is, the phase difference ΔT4 corresponds to a reciprocating transmission delay time from a time when a pulse signal is output from the variable delay section 211 to a time when the pulse signal returns to the phase difference detection section 213. The phase difference detection section 213 outputs the detected phase difference ΔT4 to the delay amount calculation section 212.

However, the phase difference ΔT4 includes the predetermined delay time Te given in the delay section 113 of the line interface card 1. The delay time Te herein is a predetermined value that does not fluctuate. Therefore, the timing generation card 2 may hold the delay time Te as a known fixed value in advance. The delay time Te is held, for example, in a memory area in the delay amount calculation section 212.

$$T\text{delay}=(\Delta T4-Te)/2 \quad \text{Expression 1}$$

Thus, the delay amount calculation section 212 may calculate, based on Expression 1, a reciprocating transmission delay time Tdelay in which the pulse signal is transmitted to the line interface card 1 and returns from the line interface card 1. That is, the delay amount calculation section 212 calculates the reciprocating transmission delay time Tdelay by subtracting the delay time Te of the delay section 113 from the phase difference ΔT4 and dividing a result of the subtraction by 2. As described above, the timing generation card 2 measures a transmission delay from a time when the pulse signal was transmitted to the line interface card 1, a time when the branch pulse signal arrived at the timing generation card 2, and the predetermined delay time Te.

$$T\text{adj}=To-T\text{delay} \quad \text{Expression 2}$$

The delay amount calculation section 212 calculates, based on Expression 2, a delay adjustment time Tadj set in the variable delay section 211. The delay adjustment time Tadj is calculated by subtracting the transmission delay time Tdelay from a predetermined reference value To, and is given to the pulse signal in the variable delay section 211.

Therefore, a transmission delay time between the timing generation card 2 and each of the line interface cards (#1 to #N) 1 is adjusted to the common reference value To. Thus, reception timings of pulse signals are synchronized among the plurality of line interface cards (#1 to #N) 1. The reference value To is set to a greater value than a maximum value of the transmission delay time Tdelay, which is assumed. As described above, in the above-described configuration, the timing generation card 2 may perform precise delay adjustment.

Next, an error of the transmission delay time Tdelay calculated by the phase difference detection section 213 will be described. As described above, the phase difference detection section 213 calculates the reciprocating transmission delay time Tdelay by dividing the reciprocating transmission delay time from which the delay time Te has been subtracted by 2. Therefore, in order to reduce the error of the transmission delay time Tdelay, propagation delay times of respective buffers on a forward path and a return path, which correspond to each other, are preferably equal to each other.

Combinations of buffers in the above-described correspondence relationship are the transmission buffer 201 and the reception buffer 202, the transmission buffer 102 and the reception buffer 101, the input buffer 111 and the output buffer 112, and the input buffer 215 and the input buffer 216. Thus, it is preferable that the values of Ta and Ti are the same, the values of Tc and Tg are the same, the values of Td and Tf are the same, and the values of Tj and Tk are the same. The values of Tb and Th are the same, because Tb and Th are of the common propagation delay time of the wirings 30.

Therefore, it is preferable that buffers, which correspond to each other, are formed by the same process and operate in the same environment and age-related deteriorations of the buffers are about the same. However, in the buffers, which correspond to each other, a transmission delay time difference (a skew) of about 0.5 nsec occurs. Thus, as for the above-described four combinations as a whole, an error of about 2 (=0.5×4) nsec occurs.

When the delay section 113 gives the delay time Te to the branch pulse signal, using the clock signal CLKb, a sampling error corresponding to one cycle of the clock signal CLKb occurs. Therefore, when the clock signal CLKb is 1 GHz, an error of 1 nsec occurs.

An error also occurs due to a frequency deviation Δppm between the clock signal CLKa of the timing generation card 2 and the clock signal CLKb of the line interface card 1. The error is proportional to the delay time Te that is given to the delay section 113. For example, when the delay time Te is 26 nsec and the frequency deviation Δppm is 100 ppm, the error is 0.0026 (=Te×Δppm×10$^{-6}$).

When the phase difference detection section 213 detects a phase difference, using the clock signal CLKa, a sampling error corresponding to two cycles of the clock signal CLKa occurs. Therefore, when the clock signal clock signal CLKb is 1 GHz, an error of 2 nsec occurs.

Therefore, the error of the reciprocating transmission delay time is calculated to be 5.0026 nsec (=2+1+0.0026+2) by summing up the above-described errors. The phase difference detection section 213 divides the reciprocating transmission delay time into two, and thus, calculates the transmission delay time Tdelay on a forward path. Thus, the error of the transmission delay time Tdelay is about 2.5 nsec (=5.0026/2).

Furthermore, when no statistical processing by the statistical processing section 217 is performed and then the variable delay section 211 gives the delay adjustment time Tadj using the clock signal CLKa, a sampling error corresponding to one cycle of the clock signal CLKa occurs in the delay adjustment time Tadj. Therefore, when the clock signal CLKa is 1 GHz, an error of 1 nsec occurs. Thus, as being added to the above-described transmission delay time Tdelay, the error of the delay adjustment time Tadj is approximately 3.5 nsec (=2.5+1).

Figure 3:
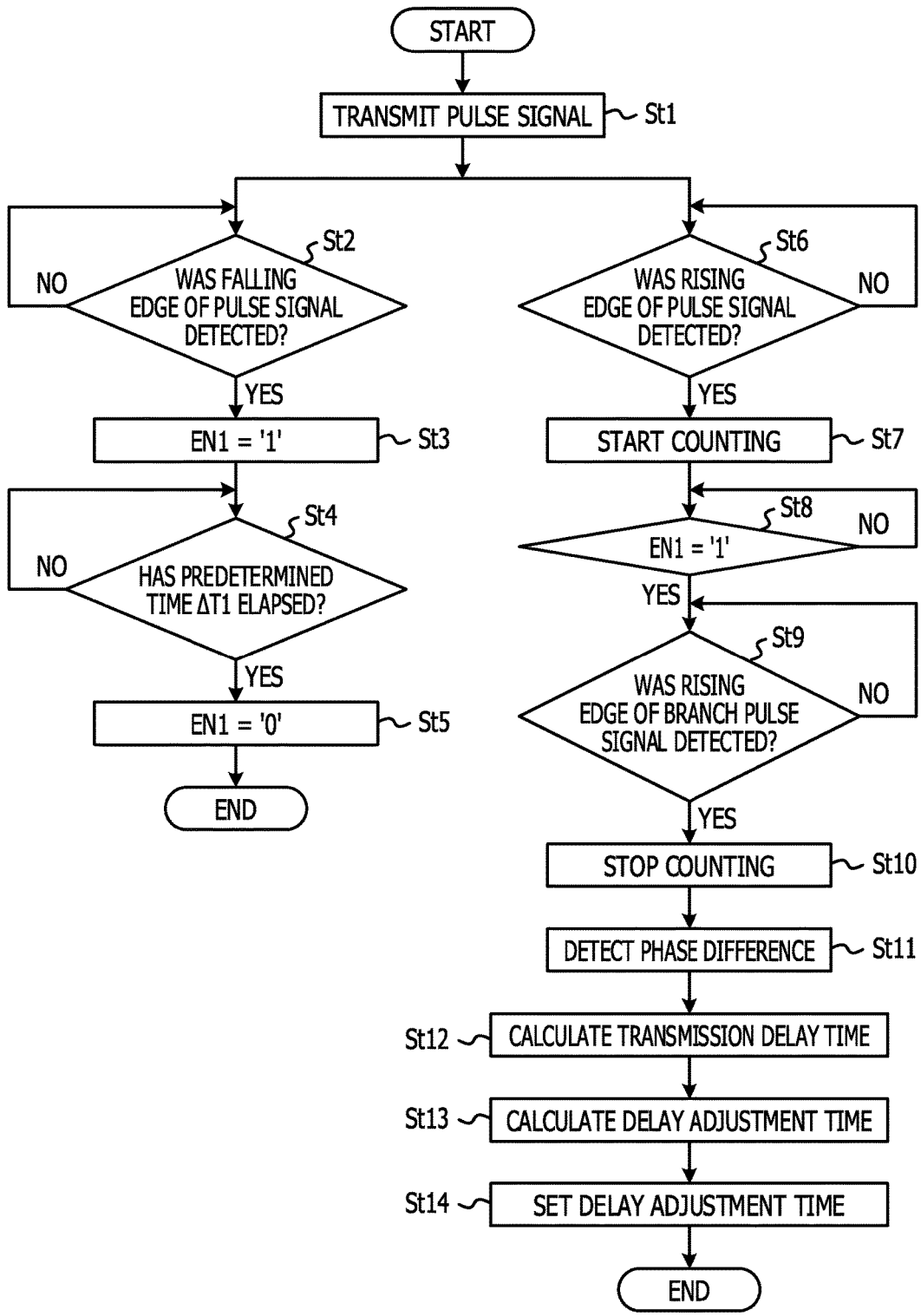
FIG. 3 is a flow chart illustrating an example of processing of a timing generation card.

Next, processing of the timing generation card 2 and the line interface cards 1 will be described with reference to a flow chart. FIG. 3 is a flow chart illustrating an example of processing of the timing generation card 2. Note that this processing is executed for each time a transmission cycle of the pulse signal starts.

The timing generation card 2 transmits a pulse signal generated by the pulse signal source 22 to the line interface card 1 from the transmission buffer 201 (St1). Subsequent processes St2 to St5 and St6 to St10 are executed in parallel.

If the control section 214 detected a falling edge of the pulse signal returned from the variable delay section 211 (YES in St2), the control section 214 causes the control signal EN1 to be "1" (St3). If the control section 214 did not detect a falling edge of the pulse signal (NO in St2), determination processing of St2 is performed again.

Next, after causing the control signal EN1 to be "1", the control section 214 determines whether or not the predetermined time ΔT1 has elapsed (St4). If the predetermined time ΔT1 has not elapsed (NO in St4), the control section 214 performs processing of St4 again.

If the predetermined time ΔT1 has elapsed (YES in St4), the control section 214 causes the control signal EN1 to be "0" (St5).

Also, if the phase difference detection section 213 detected a rising edge of the pulse signal returned from the variable delay section 211 (YES in St6), counting is started, based on the clock signal CLKa (St7). If the phase difference detection section 213 did not detect a rising edge of the pulse signal (NO in St6), the phase difference detection section 213 performs determination processing of St6 again.

Next, the phase difference detection section 213 determines whether or not the control signal EN1 is "1" (St8). If the control signal EN1 is "1" (YES in St8), the phase difference detection section 213 determines whether or not a rising edge of the branch pulse signal looped back from the line interface card 1 was detected (St9). If the control signal EN1 is "0" (NO in St8), the phase difference detection section 213 performs determination processing of St8 again.

If the phase difference detection section 213 detected a rising edge of the branch pulse signal (YES in St9), the phase difference detection section 213 stops counting (St10). If the phase difference detection section 213 did not detect a rising edge of the branch pulse signal (NO in St9), the phase difference detection section 213 performs determination processing of St9 again.

Next, the phase difference detection section 213 detects the phase difference ΔT4, based on a counter value (St11). Next, the phase difference detection section 213 calculates the transmission delay time Tdelay, based Expression 1 above (St12).

Next, the delay amount calculation section 212 calculates the delay adjustment time Tadj, based on Expression 2 above (St13). Next, the delay amount calculation section 212 sets the calculated delay adjustment time Tadj in the variable delay section 211 (St14). Thus, a delay of the pulse signal is adjusted in the variable delay section 211. In the above-described manner, the processing of the timing generation card 2 is performed.

Figure 4:
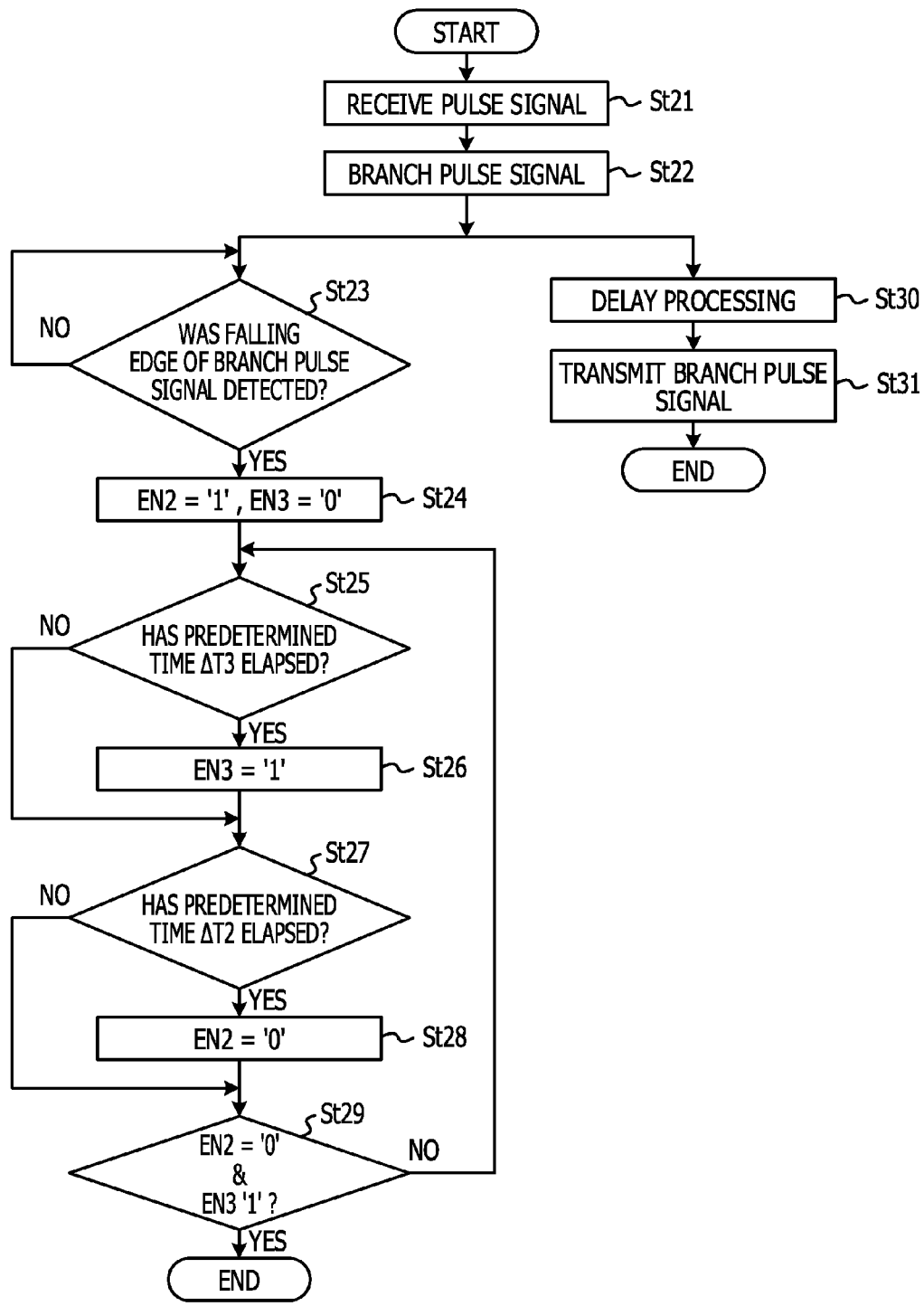
FIG. 4 is a flow chart illustrating an example of processing of a line interface card.

FIG. 4 is a flow chart illustrating an example of processing of the line interface card 1. The reception buffer 101 receives a pulse signal transmitted from the timing generation card 2 (St21).

Next, the branch section 110 branches the received pulse signal (St22). Subsequent processes St23 to St29, and St30 and St31 are executed in parallel.

If the control section 114 detected a falling edge of the branch pulse signal (YES in St23), the control section 114 causes the control signal EN2 to be "1" and the control signal EN3 to be "0" (St24). Also, if the control section 114 did not detect a falling edge of the branch pulse signal (NO in St23), the control section 114 performs determination processing of St23 again.

After causing the control signal EN3 to be "0" in the processing of St24, the control section 114 determines whether or not the predetermined time ΔT3 has elapsed (St25). If the predetermined time ΔT3 has elapsed (YES in St25), the control section 114 causes the control signal EN3 to be "1" (St26). If the predetermined time ΔT3 has not elapsed (NO St25), the control section 114 performs processing of St27 below.

After causing the control signal EN2 to be "1" in the processing of St24, the control section 114 determines whether or not the predetermined time ΔT2 has elapsed (St27). If the predetermined time ΔT2 has elapsed (YES in St27), the control section 114 causes the control signal EN2 to be "0" (St28). If the predetermined time ΔT2 has not elapsed (NO in St27), the control section 114 performs processing of St29 below.

Next, the control section 114 determines whether or not the control signal EN2 and the control signal EN3 are "0" and "1", respectively (St29). If the control signal EN2 and the control signal EN3 are "0" and "1", respectively (YES in St29), the control section 114 ends processing and, if the control signal EN2 and the control signal EN3 are not "0" and "1", respectively (NO in St29), the control section 114 performs the processing of St25 again.

The delay section 113 gives the predetermined delay time Te to the branch pulse signal input from the branch section 110 (St30). Next, the transmission buffer 102 transmits the branch pulse signal input from the delay section 113 via the output buffer 112 to the timing generation card 2 (St31). In the above-described manner, the processing of the line interface card 1 is performed.

In the above-described processing, the delay time Te is greater than a time which it takes for the input and output direction of the transmission and reception section 10 to be switched by the control signals EN2 and EN3. Also, the delay time Te is given in a range in which the branch pulse signal may reach the line interface card 1 before a time when the next pulse signal is transmitted from the timing generation card 2. Conditions for the delay time Te will be described below.

Figure 5:
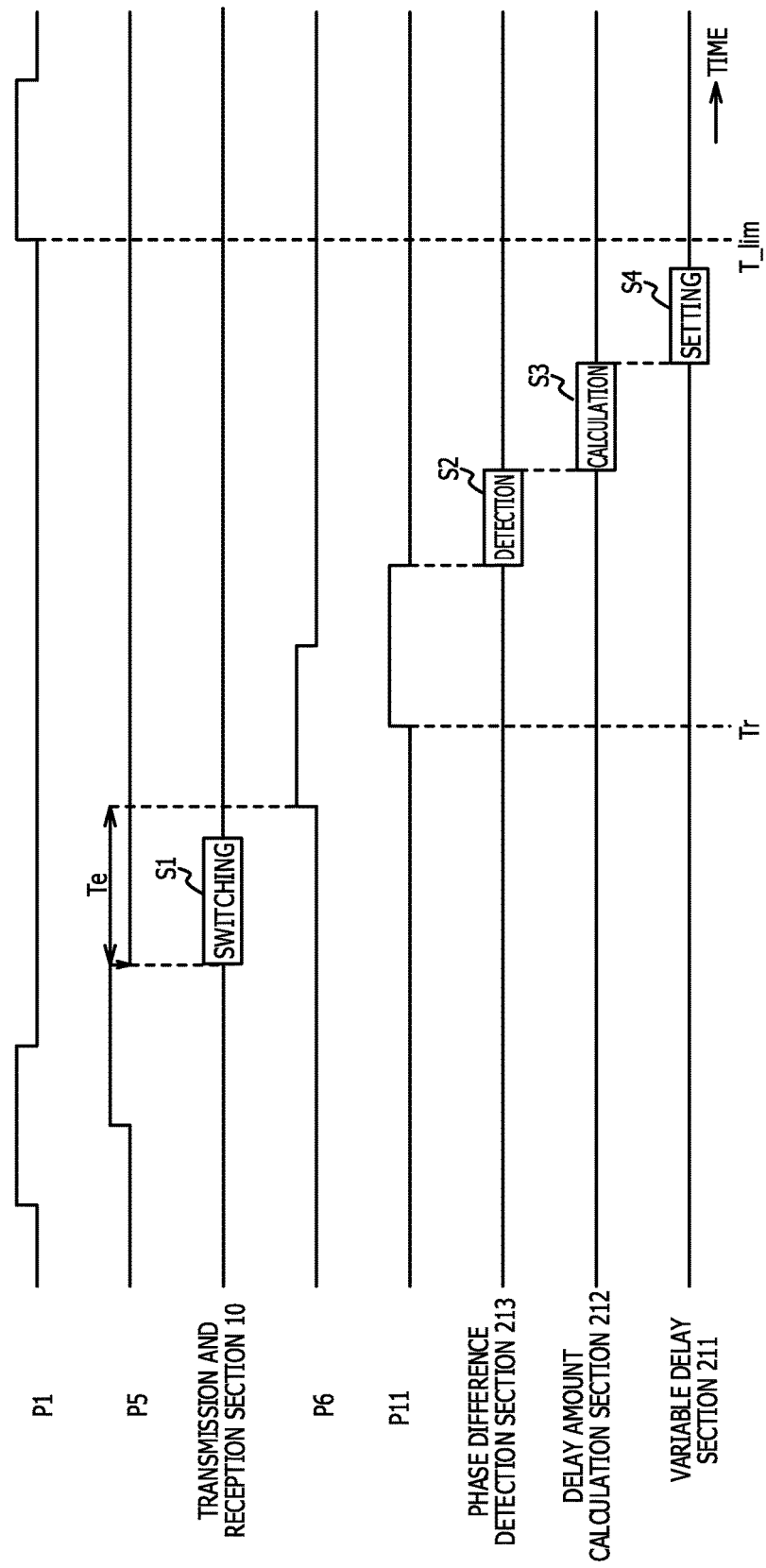
FIG. 5 is a time chart illustrating conditions for a delay time.

FIG. 5 is a time chart illustrating conditions for the delay time Te. In FIG. 5, the waveforms P1, P5, P6, and P11 represent respective waveforms of pulse signals denoted by the reference characters P1, P5, P6, and P11 in FIG. 1.

As indicated by the waveform P1, the pulse signal is cyclically transmitted from the variable delay section 211. As indicated by the waveform P5, after a falling edge of the branch pulse signal is detected, the delay time Te is given to the branch pulse signal by the delay section 113. As denoted by the reference character S1, the transmission and reception section 10 switches the input and output direction in accordance with the control signals EN2 and EN3 during the delay time Te. Thus, the delay time Te is set to a greater value than the time which it takes for the input and output direction of the transmission and reception section 10 to be switched.

As indicated by the waveform P6, the branch pulse signal is delayed only by the predetermined delay time Te, is thus output to the output buffer 112, and is transmitted to the timing generation card 2 from the transmission buffer 102. As indicated by the waveform P11, the branch pulse signal arrives at the phase difference detection section 213 at a time Tr.

In this case, before the transmission buffer 102 transmits the branch pulse signal, the delay section 113 gives the predetermined delay time Te to the branch pulse signal in a range in which the branch pulse signal may reach the timing generation card 2 before a time Tlim when the next pulse signal is transmitted from the timing generation card 2. Therefore, even when, after the predetermined delay time Te is given, the branch pulse signal is transmitted, the branch pulse signal may reach the timing generation card 2 before the time when the next pulse signal is transmitted from the timing generation card 2. Thus, collision of the branch pulse signal with the next pulse signal on the wiring 30 of the BWB 3 is not caused.

As denoted by the reference character S2, the phase difference detection section 213 detects the phase difference ΔT4 from the branch pulse signal. As denoted by the reference character S3, the delay amount calculation section 212 calculates the transmission delay time Tdelay from the phase difference ΔT4 as a detection result. The delay amount calculation section 212 calculates the delay adjustment time Tadj from the transmission delay time Tdelay and, as denoted by the reference character S4, sets the calculated delay adjustment time Tadj in the variable delay section 211.

A series of processes S2 to S4 described above is completed before the transmission time Tlim of the next pulse signal transmitted from the variable delay section in time for delay adjustment. Therefore, in addition to the above-described conditions, the delay time Te is set in a range in which the series of processes S2 to S4 is completed before the transmission time Tlim of the next pulse signal.

As described above, the line interface card 1 gives the predetermined delay time Te that satisfies the above-described conditions to the branch pulse signal. Thus, the timing generation card 2 is enabled to perform delay adjustment at all times in an operation state in which the pulse signal is cyclically transmitted.

The line interface card 1 is configured such that the delay time Te is given to the branch pulse signal by the delay section 113 but, as will be described below, the line interface card 1 is not limited thereto.

Figure 6:
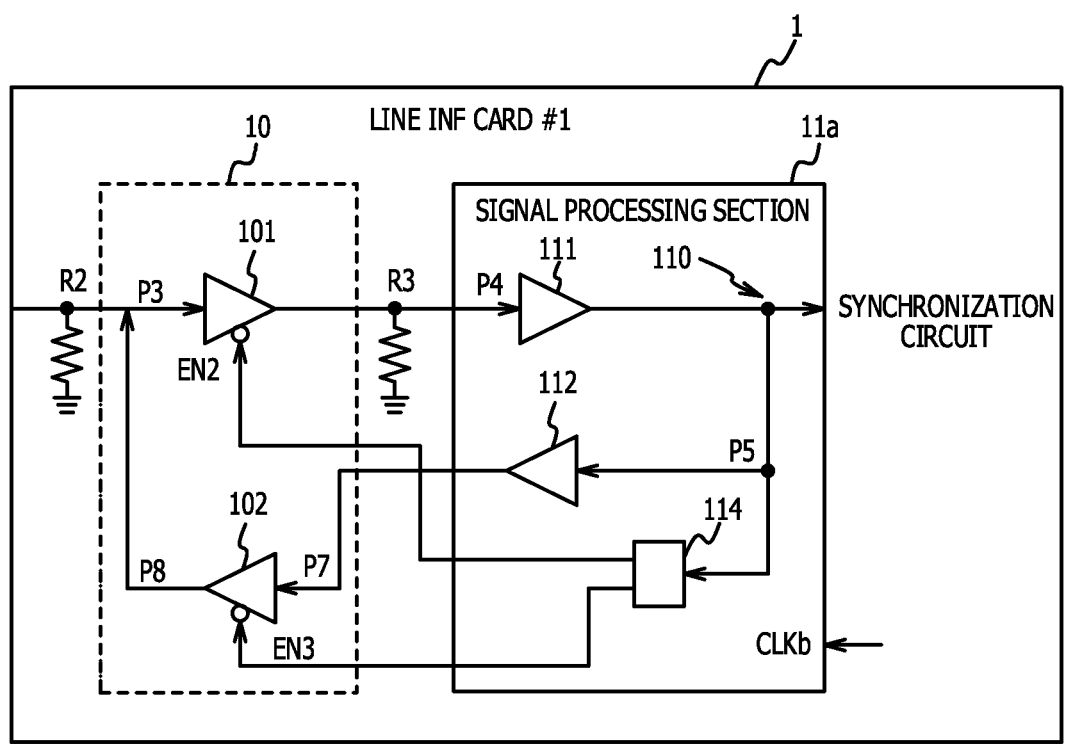
FIG. 6 is a configuration diagram illustrating an example of the line interface card.

FIG. 6 is a configuration diagram illustrating an example of the line interface card 1. In FIG. 6, each component that is in common with that in FIG. 1 is denoted by the same reference character as that in FIG. 1 and the description thereof will be omitted.

In this example, the output buffer 112 in a signal processing section 11a functions as the delay section 113 and gives a delay time to a branch pulse signal. Thus, in this example, the delay section 113 is not provided. The propagation delay time Tf of the output buffer 112 corresponds to the above-described delay time Te and is greater than a time which it takes to switch the input and output direction of the transmission and reception section 10. The propagation delay time Tf is a value in a range in which the branch pulse signal may reach the timing generation card 2 before the time Tlim when a next pulse signal is transmitted from the timing generation card 2.

$$Tdelay = (Ta + Tb + Tc + Td + Tf + \ldots + Tj)/2 \quad \text{Expression 3}$$

Also in this example, the propagation delay time Tf is a fixed value that does not fluctuate. Therefore, the delay amount calculation section 212 may calculate the transmission delay time Tdelay, based on Expression 3 above. Thus, the timing generation card 2 may perform precise delay adjustment.

Figure 7:
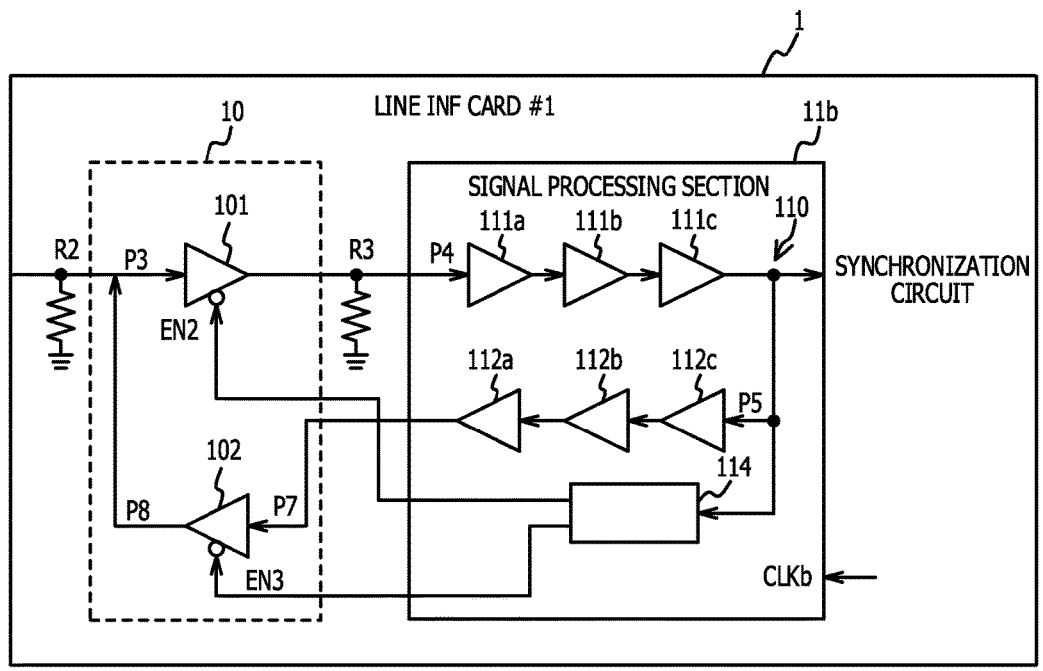
FIG. 7 is a configuration diagram illustrating another example of the line interface card.

FIG. 7 is a configuration diagram illustrating another example of the line interface card 1. In FIG. 7, each component that is in common with that in FIG. 1 is denoted by the same reference character as that in FIG. 1 and the description thereof will be omitted.

In this example, a signal processing section 11b includes the branch section 110, input buffers 111a to 111c of a plurality of stages, output buffers 112a to 112c of a plurality of stages, and the control section 114. The input buffers 111a to 111c of a plurality of stages are coupled to one another in series and a pulse signal received by the reception buffer 101 is input thereto. The pulse signal output from the input buffer 111c is branched by the branch section 110.

A branch pulse signal branched by the branch section 110 is input to the output buffers 112a to 112c of a plurality of stages and the control section 114. The output buffers 112a to 112c of a plurality of stages are coupled to one another in series, function as the delay section 113, and give a delay time to the branch pulse signal. In this case, the total Tf of propagation delay times of the output buffers 112a to 112c corresponds to the delay time Te, and is greater than a time which it takes to switch the input and output direction of the transmission and reception section 10. The total Tf of the propagation times is a value in a range in which the branch pulse signal may reach the timing generation card 2 before the time Tlim when the next pulse signal is transmitted from the timing generation card 2.

In order to equalize respective transmission delay times of a forward path and a return path of the pulse signal, the total Tf of the propagation delay times of the output buffers 112a to 112c are preferably equal to the total Td' of respective propagation delay times of the input buffers 111a to 111c. Therefore, the number of stages of the input buffers 111a to 111c is the same as the number of stages of the output buffers 112a to 112c (three stages in this example).

$$T\text{delay}=(Ta+Tb+Tc+Td'+Tf+\ldots+Tj)/2 \qquad \text{Expression 4}$$

Also in this example, the total Tf of the propagation delay times of the output buffers 112a to 112c is a fixed value that does not fluctuate. Therefore, in this example, the delay amount calculation section 212 may calculate the transmission delay time Tdelay, based on Expression 4 above. Thus, the timing generation card 2 may perform precise delay adjustment.

Figure 8:
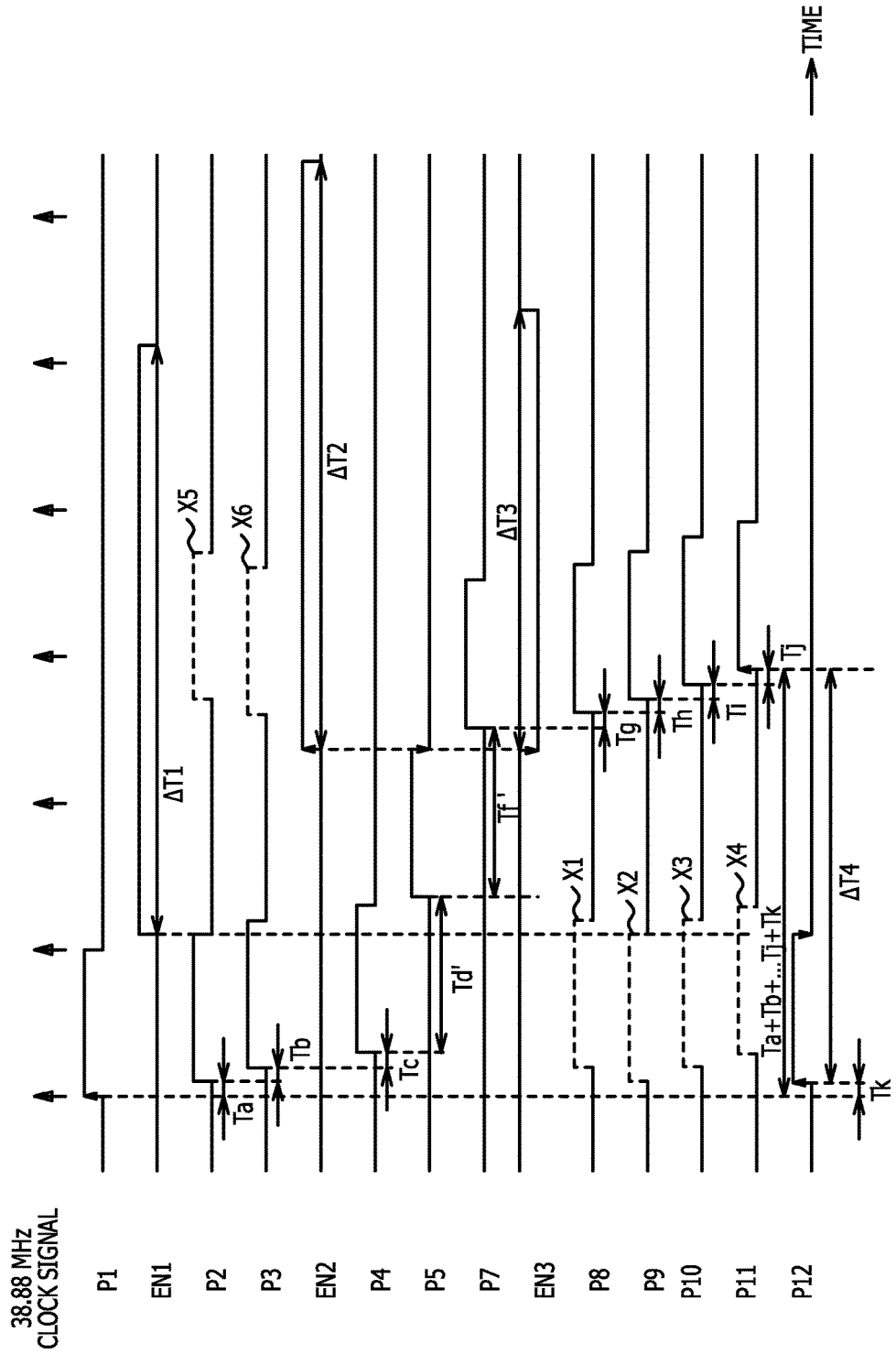
FIG. 8 is a time chart illustrating another example of the operation of the transmission device.

FIG. 8 is a time chart illustrating an operation of a transmission device in the example of FIG. 7. Waveforms P3 to P5, P7, and P8 represent respective waveforms of pulse signals denoted by the reference characters P3 to P5, P7, and P8 in FIG. 7. In FIG. 8, as a reference of the width of a pulse signal, a rising edge of a 38.88 MHz clock signal is illustrated.

As indicated by the waveform P5, the pulse signal output from the reception buffer 101 is input to the input buffers 111a to 111c of a plurality of stages, is delayed only by a delay time Td', and is thus output. After being is branched by the branch section 110, the pulse signal output from the input buffer 111c is input as the branch pulse signal to the output buffers 112a to 112c of a plurality of stages, is delayed only by the delay time Tf, and is thus output. In this case, as described above, the delay times Td' and Tf are preferably equal to each other.

In the transmission and reception section 10, the input and output direction is switched in accordance with the control signals EN2 and EN3 during the delay time Tf. Thus, also in this example, delay adjustment is performed in a similar manner to that in the example of FIG. 1. As for the example of FIG. 6, a similar operation is performed for the input buffer 111 and the output buffer 112.

Delay adjustment of the pulse signal is performed in the timing generation card 2. Thus, in one of the transmission devices, the line interface cards 1 illustrated in FIG. 1, FIG. 6, and FIG. 7 may be provided in a mixed manner. Furthermore, delay adjustment is performed at all times during an operation in which the pulse signal is transmitted. Thus, even when switching of an operation system and a reserve system of each of redundant configurations of the timing generation card 2 and the line interface cards 1 or switching of each of the line interface cards 1 and the timing generation card 2 to the corresponding one of cards 1 and 2 of other types is performed, optimal delay adjustment in accordance with an environment is performed.

Second Embodiment

In the first embodiment, when the control section 114 of the line interface card 1 detects a rear edge, that is, a falling edge, of the branch pulse signal, the control section 114 controls the control signals EN2 and EN3. Also, when the control section 214 of the timing generation card 2 detects a rear edge, that is, a falling edge, of the pulse signal, the control section 214 controls the control signal EN1.

However, when the control section 114 of the line interface card 1 detects a front edge, that is, a rising edge, of the branch pulse signal, the control section 114 may control the control signals EN2 and EN3. Also, when the control section 214 of the timing generation card 2 detects a front edge, that is, a rising edge, of the pulse signal, the control section 214 may control the control signal EN1. In this case, as will be described below, the control signals EN1 to EN3 are delayed only by at least a time corresponding to the width of the pulse signal, and thus, delay adjustment similar to that in the first embodiment may be performed.

Figure 9:
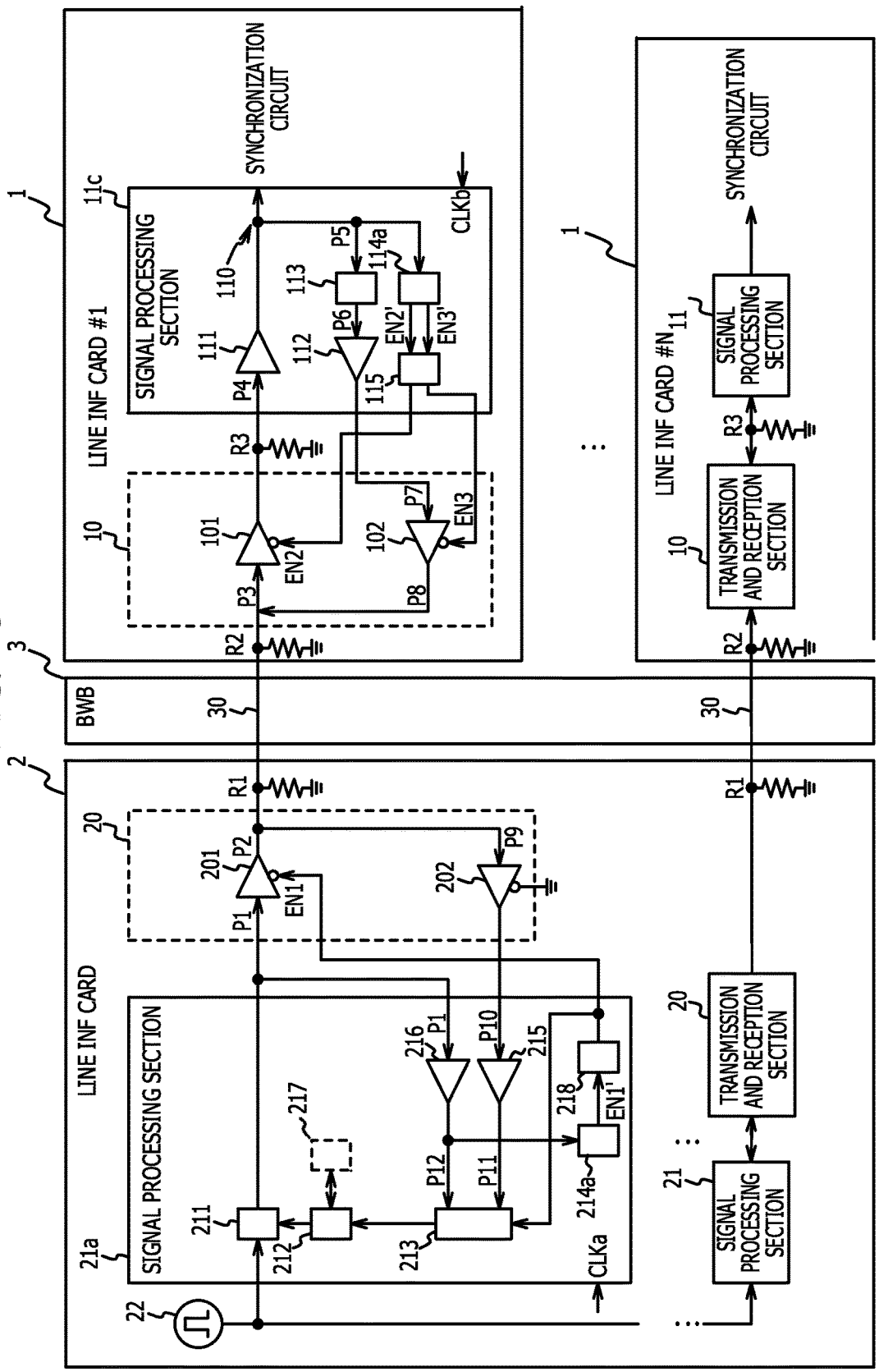
FIG. 9 is a configuration diagram illustrating a transmission device according to a second embodiment.

FIG. 9 is a configuration diagram illustrating a transmission device according to a second embodiment. In FIG. 9, each component that is in common with that in FIG. 1 is denoted by the same reference character as that in FIG. 1 and the description thereof will be omitted.

Figure 10:
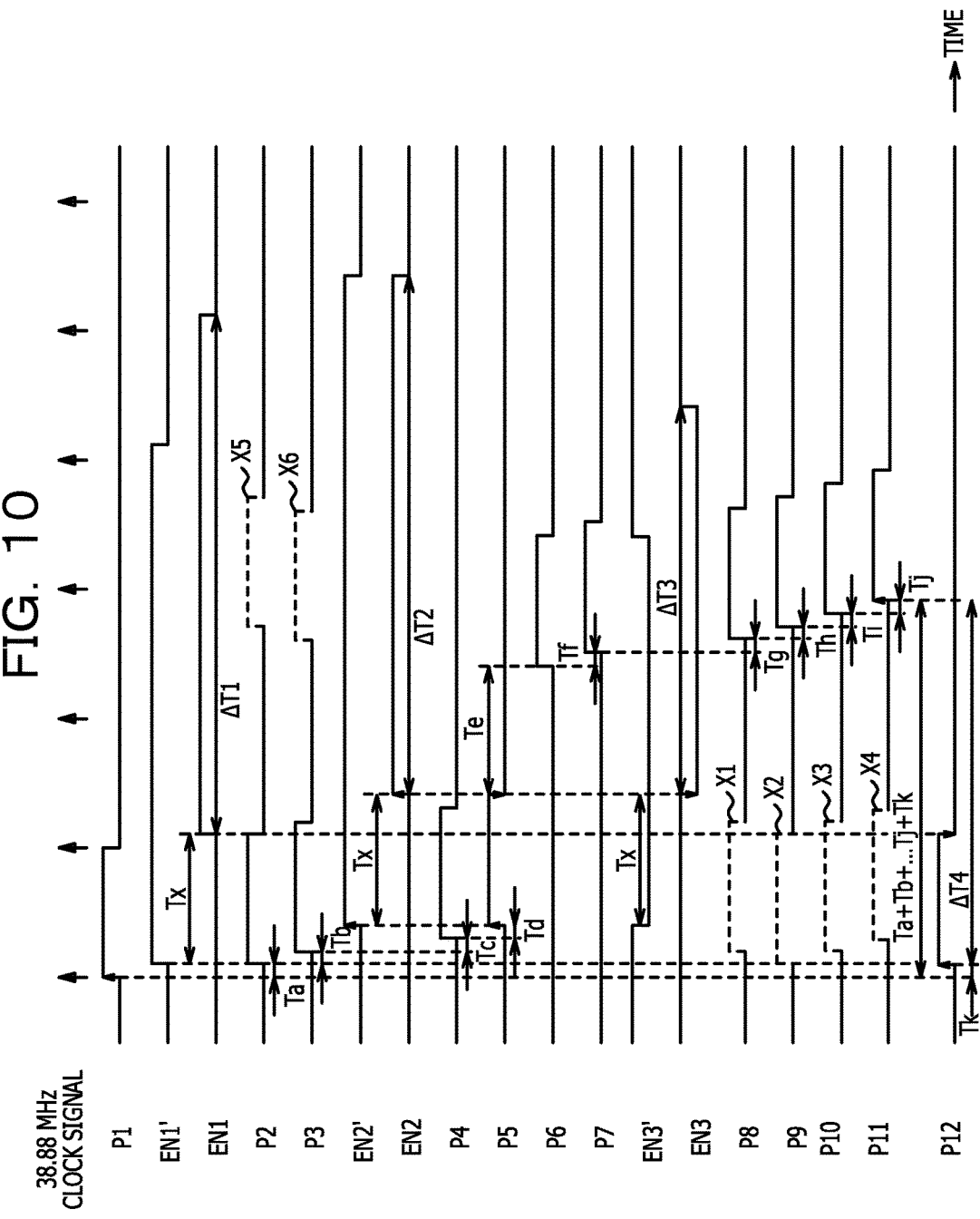
FIG. 10 is a time chart illustrating an example of an operation of the transmission device according to the second embodiment.

FIG. 10 is a time chart illustrating an example of an operation of the transmission device according to the second embodiment. Waveforms P1 to P12 represent respective waveforms of pulse signals denoted by the reference characters P1 to P12 in FIG. 9. In FIG. 10, as a reference of the width of a pulse signal, a rising edge of a 38.88 MHz clock signal is illustrated.

The timing generation card 2 includes the plurality of transmission reception sections 20, a plurality of signal processing sections 21a, the pulse signal source 22, and the plurality of pull-down resistors R1. Each of the signal processing sections 21a is formed by, for example, an FPGA. The signal processing section 21a includes the variable delay section 211, the delay amount calculation section 212, the phase difference detection section 213, a control section 214a, the input buffers 215 and 216, the statistical processing section 217, and a timing adjustment section 218.

When the control section 214a detects a rising edge of the pulse signal input from the variable delay section 211 via the input buffer 216 (see the waveform P12), the control section 214a switches the value of a control signal EN1' from "0" to "1" (see the waveform of the control signal EN1'). After giving a predetermined delay time Tx to the control signal EN1', the timing adjustment section 218 outputs, as the control signal EN1, the control signal EN1' to the transmission buffer 201 and the phase difference detection section 213 (see the waveform of the control signal EN1). The delay time Tx has the time width of the pulse signal, that is, a time width corresponding to one 38.88 MHz clock.

The line interface card 1 includes the transmission and reception section 10, a signal processing section 11c, and the pull-down resistors R2 and R3. The signal processing section 11c is formed by, for example, an FPGA. The signal processing section 11c includes the branch section 110, the input buffer 111, the output buffer 112, the delay section 113, a control section 114a, and a timing adjustment section 115.

When the control section 114a detects a front edge of the branch pulse signal, the control section 114a rejects reception processing of the reception buffer 101 and permits transmission processing of the transmission buffer 102. More specifically, when the control section 114a detects a rising edge of the pulse signal input from the branch section 110, the control section 114a switches the value of a control signal EN2' from "0" to "1", and switches the value of a control signal EN3' from "1" to "0" (see each of the respective waveforms of the control signals EN2' and EN3').

After giving the predetermined delay time Tx to the control signal EN2', the timing adjustment section 115 outputs, as the control signal EN2, the control signal EN2' to the reception buffer 101 (see the waveform of the control signal EN2). After giving the predetermined delay time Tx to the control signal EN3', the timing adjustment section 115 outputs, as the control signal EN3, the control signal EN3' to the transmission buffer 102 (see the waveform of the control signal EN3).

Thus, the control signals EN1 to EN3 are adjusted to have the same timings to those in the first embodiment by the timing adjustment sections 115 and 218. Thus, also in this embodiment, similar delay adjustment to that in the first embodiment is performed. Also in this embodiment, the configurations illustrated in FIG. 6 and FIG. 7 may be employed.

In this embodiment, the timing adjustment sections 115 and 218 are added to the configuration of the first embodiment. Thus, the circuit scale is increased, as compared to the first embodiment. Therefore, when a configuration in which, similar to the control sections 114 and 214 of the first embodiment, when a rear edge, that is, a falling edge, of the pulse signal is detected, the control signals EN1 to EN3 are switched is employed, the circuit scale is reduced.

Third Embodiment

In the first embodiment and the second embodiment, a configuration used when the form of the pulse signal is a HIGH pulse has been described. However, even when the pulse signal is in the form of a LOW pulse, delay adjustment may be performed using a similar configuration.

Figure 11:
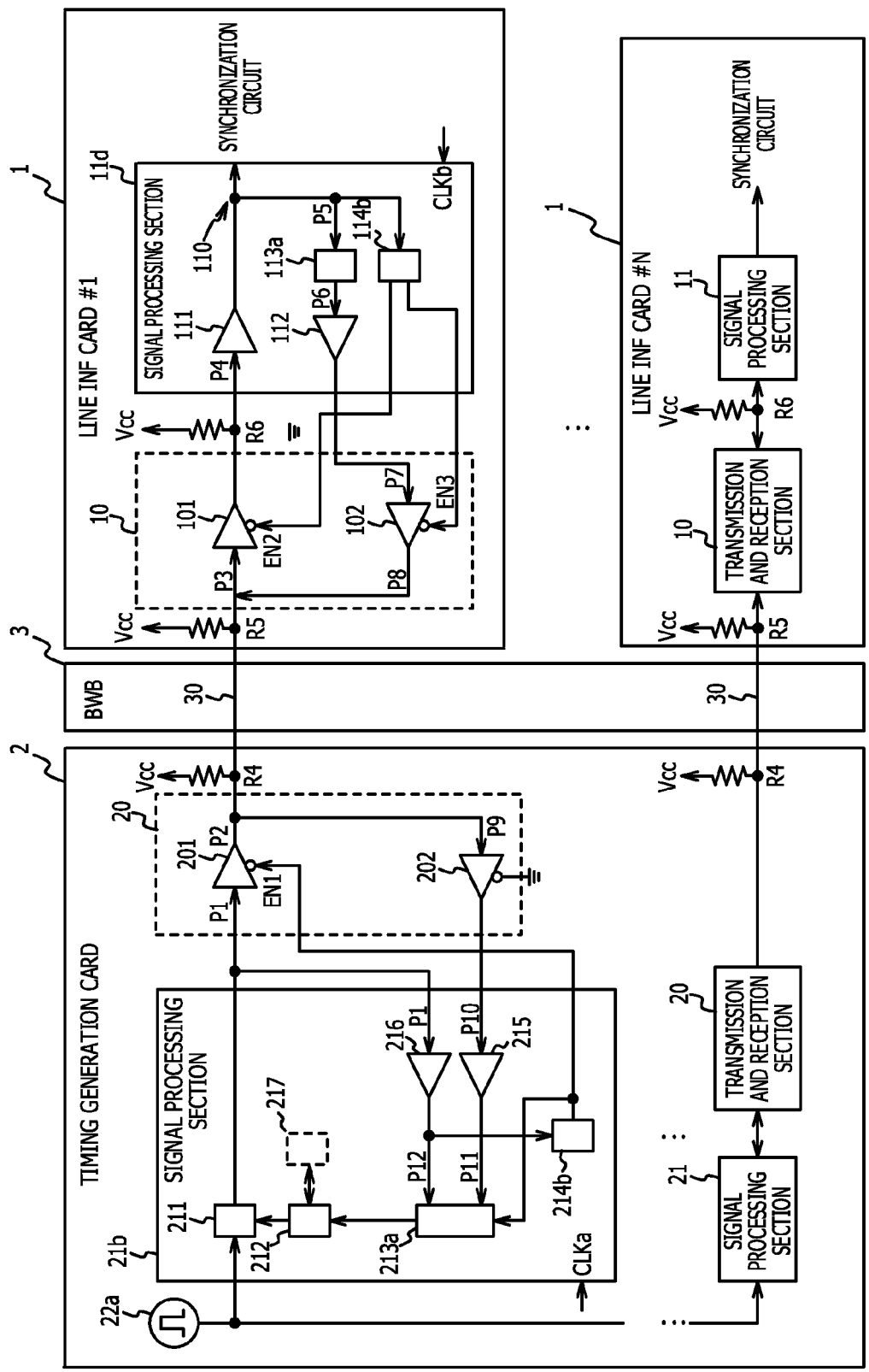
FIG. 11 is a configuration diagram illustrating a transmission device according to a third embodiment.

FIG. 11 is a configuration diagram illustrating a transmission device according to a third embodiment. In FIG. 11, each component that is in common with that in FIG. 1 is denoted by the same reference character as that in FIG. 1, and the description thereof will be omitted.

Figure 12:
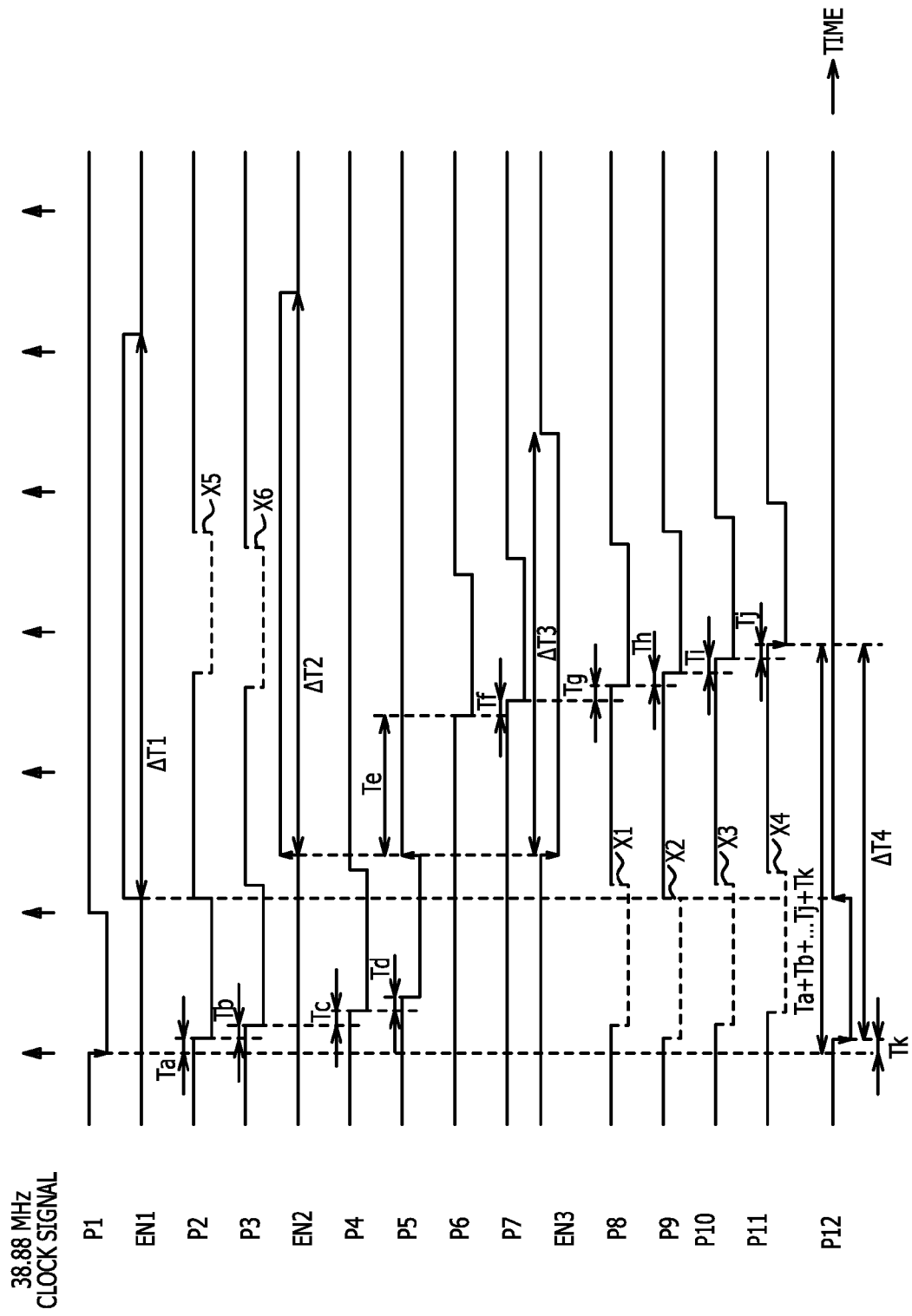
FIG. 12 is a time chart illustrating an example of an operation of the transmission device according to the third embodiment.

FIG. 12 is a time chart illustrating an example of an operation of the transmission device according to the third embodiment. Waveforms P1 to P12 represent respective waveforms of pulse signals denoted by the reference characters P1 to P12 in FIG. 11. In FIG. 12, as a reference of the width of the pulse signal, a rising edge of a 38.88 MHz clock signal is illustrated.

The timing generation card 2 includes the plurality of transmission and reception sections 20, a plurality of signal processing sections 21b, a pulse signal source 22a, and a plurality of pull-up resistors R4 coupled to a power supply source Vcc. The signal processing sections 21b is formed by, for example, an FPGA. The signal processing sections 21b includes the variable delay section 211, the delay amount calculation section 212, a phase difference detection section 213a, a control section 214b, the input buffers 215 and 216, and the statistical processing section 217. The pulse signal source 22a outputs the pulse signal in the form of a LOW pulse to the variable delay section 211.

When the control section 214b detects a rising edge of the pulse signal input from the variable delay section 211 via the input buffer 216 (see the waveform P12), the control section 214b switches the value of the control signal EN1 from "0" to "1" (see the waveform of the control signal EN1). Thus, an output of the transmission buffer 201 is high impedance. However, because the pull-up resistor R4 is coupled to a subsequent stage of an output terminal of the transmission buffer 201, the potential of the wiring 30 coupled to the transmission buffer 201 is fixed to a high potential (HIGH). Therefore, the pulse signal received in the line interface card 1 is not influenced.

As described above, when the control section 214b detects a rear edge, that is, a rising edge, of the pulse signal, the control section 214b causes the control signal EN1 to be "1", but control of the control section 214b is not limited thereto. That is, when the control section 214b detects a front edge, that is, a falling edge, of the pulse signal, the control section 214b may cause the control signal EN1 to be "1". In this case, similar to the example of FIG. 9, the timing adjustment section 218 that delays the control signal EN1 is provided in the signal processing sections 21b.

The phase difference detection section 213a detects a phase difference ΔT4 between a falling edge (see the waveform P12) of the pulse signal input from the variable delay section 211 via the input buffer 216 and a falling edge (see the waveform P11) of the branch pulse signal looped back from the line interface card 1. Thus, similar to the first embodiment, the delay amount calculation section 212 may calculate the transmission delay time Tdelay from the phase difference ΔT4, using Expression 1.

The line interface card 1 includes the transmission and reception section 10, a signal processing section 11d, and pull-up resistors R5 and R6. The signal processing section 11d is formed by, for example, an FPGA. The signal processing section 11d includes the branch section 110, the input buffer 111, the output buffer 112, a delay section 113a, and a control section 114b.

When the delay section 113a detects a rising edge of the branch pulse signal input from the branch section 110 (see the waveform P5), the delay section 113a gives the predetermined delay time Te to the branch pulse signal (see the waveform P6). In this case, similar to the first embodiment, the delay time Te satisfies the conditions illustrated in FIG. 5. When the control section 114b detects a rising edge of the branch pulse signal input from the branch section 110 (see the waveform P5), the control section 114b switches the value of the control signal EN2 from "0" to "1" (see the waveform of the control signal EN2).

Thus, an output of the reception buffer 101 is high impedance. However, the pull-up resistor R6 is coupled to a subsequent stage of an output terminal of the reception buffer 101, the potential of the reception buffer 101 is fixed to a high potential (HIGH). Therefore, the pulse signal processed in the line interface card 1 is not influenced.

When the control section 114b detects a rising edge of the branch pulse signal input from the branch section 110 (see the waveform P5), the control section 114b switches the value of the control signal EN3 from "1" to "0" (see the waveform of the control signal EN3). When the control signal EN3 is "1", an output of the transmission buffer 102 is high impedance. However, since the pull-up resistor R5 is coupled to a subsequent stage of the transmission buffer 102, the potential of the wiring 30 coupled to the transmission buffer 102 is fixed to a high potential (HIGH). Thus, the branch pulse signal received in the line interface card 1 is not influenced.

As described above, when the control section 114b detects a rear edge, that is, a rising edge, of the pulse signal, the control section 114b causes the control signal EN2 to be "1" and the control signal EN3 to be "0", but control of the control section 114b is not limited thereto. That is, when the control section 114b detects a front edge, that is, a falling edge, of the pulse signal, the control section 114b may cause the control signal EN2 to be "1" and the control signal EN3 to be "0". In this case, similar to the example of FIG. 9, the timing adjustment section 115 that delays the control signals EN 2 and EN 3 is provided in the signal processing section 11d.

As has been described above, each of the line interface cards 1 that are communication devices according to an embodiment, includes the reception buffer 101, the branch section 110, the transmission buffer 102, and the delay section 113. The reception buffer 101 receives a pulse signal cyclically transmitted from the timing generation card 2 via the corresponding one of the wirings 30 of the BWB 3. The branch section 110 branches the pulse signal received by the reception buffer 101.

The transmission buffer 102 transmits a branch pulse signal branched from the pulse signal by the branch section 110 to the timing generation card 2 via the wiring 30 of the BWB 3. Before the transmission buffer 102 transmits the branch pulse signal, the delay section 113 gives the predetermined delay time Te (or, Tf or Tf') to the branch pulse signal.

In the above-described configuration, the reception buffer 101 receives the pulse signal cyclically transmitted from the timing generation card 2 via the wiring 30 of the BWB 3. Thus, the branch section 110 branches the pulse signal received by the reception buffer 101. Thus, the line interface card 1 may use the pulse signal, which is a branch source, in time synchronization with the timing generation card 2.

The transmission buffer 102 transmits the branch pulse signal branched from the pulse signal by the branch section 110 to the timing generation card 2 via the wirings 30 of the BWB 3. Before the transmission buffer 102 transmits the branch pulse signal, the delay section 113 gives the predetermined delay time Te to the branch pulse signal.

Thus, the line interface card 1 may ensure a time which it takes for the transmission buffer 102 to be in a state where the transmission buffer 102 may transmit the branch pulse signal. Furthermore, because the delay time Te given to the branch pulse signal is a predetermined value, the timing generation card 2 may hold the delay time Te as a fixed value that does not fluctuate in advance.

Therefore, the timing generation card 2 may receive the branch pulse signal and measure the transmission delay time Tdelay from the phase difference ΔT4 between the transmitted pulse signal and the received branch pulse signal, and the delay time Te. Thus, the timing generation card 2 may adjust a delay of the pulse signal, based on the transmission delay time Tdelay.

Thus, with a communication device according to an embodiment, precise delay adjustment may be performed.

A transmission delay adjustment method according to an embodiment includes:

(1) cyclically transmitting a pulse signal to the corresponding line interface card 1 from the timing generation card 2 via the corresponding wiring 30 of the BWB 3;

(2) branching the pulse signal received by the line interface card 1;

(3) transmitting a branch pulse signal branched from the pulse signal to the timing generation card 2 from the line interface card 1 via the wiring 30 of the BWB 3;

(4) giving, before transmitting the branch pulse signal to the timing generation card 2 from the line interface card 1, the predetermined delay time Te to the branch pulse signal; and (5) measuring a transmission delay from a time when the pulse signal was transmitted to the second communication device, a time when the branch pulse signal arrived at the timing generation card 2, and the predetermined delay time Te.

A transmission delay adjustment method according to an embodiment includes a similar configuration to that of the above-described line interface card 1, and therefore, has similar advantages to those described above.

The above-described embodiments are preferred embodiments of the present disclosure. However, the present disclosure is not limited thereto, and various modifications may be made without departing from the gist of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
    a reception buffer configured to receive a pulse signal cyclically transmitted from a transmission source device via a transmission line;
    a branch circuit configured to generate a branch pulse signal by branching the pulse signal;
    a delay circuit configured to add a predetermined delay time to the generated branch pulse signal; and
    a transmission buffer configured to transmit the branch pulse signal to which the predetermined delay time was added to the transmission source device via the transmission line,
    wherein, before the transmission buffer transmits the branch pulse signal, the delay circuit is configured to add the predetermined delay time to the branch pulse signal in a range in which the branch pulse signal may reach the transmission source device before a time when a next pulse signal is transmitted from the transmission source device.

2. The communication device according to claim 1, further comprising:
    a processor configured to control permission and rejection of transmission processing of the transmission buffer and permission and rejection of reception processing of the reception buffer in response to the branch pulse signal input from the branch circuit,
    wherein the processor is configured to reject the reception processing of the reception buffer and permits the transmission processing of the transmission buffer, when the processor detects a rear edge of the branch pulse signal.

3. The communication device according to claim 2, wherein the processor is configured to:
    permit the reception processing of the reception buffer after a first predetermined time has elapsed since the processor rejected the reception processing of the reception buffer, and
    rejects the transmission processing of the transmission buffer after a second predetermined time has elapsed since the processor permitted the transmission processing of the transmission buffer.

4. The communication device according to claim 2, wherein the processor is configured to control the transmission buffer and the reception buffer, using a negative logic enable signal.

5. The communication device according to claim 1, wherein the delay circuit is a buffer different from the reception buffer and the transmission buffer.

6. The communication device according to claim 1, further comprising:
a synchronization circuit coupled to a subsequent stage of the branch circuit and configured to receive the pulse signal after the branch pulse signal was generated therefrom and execute time synchronization processing.

7. The communication device according to claim 1, further comprising:
a first switch configured to switch on and off of electrical coupling between the reception buffer and the transmission line; and
a second switch configured to switch on and off of electrical coupling between the transmission buffer and the transmission line.

8. A pulse signal delay adjustment method, comprising:
transmitting, by a first communication card, a cyclically transmitted pulse signal to a second communication card via a transmission line;
generating, by the second communication card, a branch pulse signal by branching the pulse signal;
adding a predetermined delay time to the generated branch pulse signal;
transmitting the branch pulse signal to which the predetermined delay time was added to the first communication card via the transmission line;
measuring a transmission delay, based on a time when the pulse signal was transmitted to the first communication card, a time when the branch pulse signal arrived at the second transmission card, and the predetermined delay time, by the first communication card; and
executing delay adjustment of the pulse signal, based on a result of the measuring a transmission delay,
wherein the adding includes adding, before the transmitting of the branch pulse signal, the predetermined delay time to the branch pulse signal in a range in which the branch pulse signal may reach the first communication card before a time when a next pulse signal is transmitted from the first communication card.

9. The pulse signal delay adjustment method according to claim 8, wherein the executing the delay adjustment includes:
detecting a phase difference between the pulse signal transmitted to the second communication card and the branch pulse signal received from the second communication card, and
calculating a delay adjustment time by subtracting the predetermined delay time from the detected phase difference and then dividing a result of the subtraction by 2.

10. The pulse signal delay adjustment method according to claim 8, further comprising:
controlling permission and rejection of transmission processing of a transmission buffer in the second communication card and permission and rejection of reception processing of a reception buffer in the second communication card in response to the branch pulse signal,
wherein the controlling includes rejecting the reception processing of the reception buffer and permitting the transmission processing of the transmission buffer, when the processor detects a rear edge of the branch pulse signal.

11. The pulse signal delay adjustment method according to claim 10, wherein the controlling includes:
permitting the reception processing of the reception buffer after a first predetermined time has elapsed since the processor rejected the reception processing of the reception buffer, and
rejecting the transmission processing of the transmission buffer after a second predetermined time has elapsed since the processor permitted the transmission processing of the transmission buffer.

12. The pulse signal delay adjustment method according to claim 10,
wherein the controlling includes controlling the transmission buffer and the reception buffer, using a negative logic enable signal.

13. The pulse signal delay adjustment method according to claim 10,
wherein the adding includes adding the predetermined delay time by a buffer different from the reception buffer and the transmission buffer.

14. The pulse signal delay adjustment method according to claim 8, further comprising:
receiving, by a synchronization circuit coupled to a subsequent stage of the second communication card, the pulse signal after the branch pulse signal was generated therefrom, and
executing time synchronization processing.

15. A communication system, comprising:
a first communication card; and
a second communication card coupled to the first communication card via a transmission line,
wherein the first communication card is configured to transmit a cyclically transmitted pulse signal to a second communication card via the transmission line, and
wherein the second communication card is configured to:
generate a branch pulse signal by branching the pulse signal,
add a predetermined delay time to the generated branch pulse signal, and
transmit the branch pulse signal to which the predetermined delay time was added to the first communication card via the transmission line, and
wherein the first communication card is configured to:
measure a transmission delay, based on a time when the pulse signal was transmitted to the first communication card, a time when the branch pulse signal arrived at the second transmission card, and the predetermined delay time, by the first communication card; and
execute delay adjustment of the pulse signal, based on a result of the measuring a transmission delay,
wherein, before transmitting of the branch pulse signal, the second communication card is configured to add the predetermined delay time to the branch pulse signal in a range in which the branch pulse signal may reach the first communication card before a time when a next pulse signal is transmitted from the first communication card.

16. The communication system according to claim 15, wherein the second communication card includes a processor configured to control permission and rejection of transmission processing of a transmission buffer in the second communication card and permission and rejection of reception processing of a reception buffer in the second communication card in response to the branch pulse signal, wherein the processor is configured to reject the reception processing of the reception buffer and permits the transmission processing of the transmission buffer, when the processor detects a rear edge of the branch pulse signal.

17. The communication system according to claim 16, wherein the processor is configured to:

permit the reception processing of the reception buffer after a first predetermined time has elapsed since the processor rejected the reception processing of the reception buffer, and rejects the transmission processing of the transmission buffer after a second predetermined time has elapsed since the processor permitted the transmission processing of the transmission buffer.

18. The communication system according to claim 16, wherein the processor is configured to control the transmission buffer and the reception buffer, using a negative logic enable signal.

19. The communication system according to claim 16, wherein the second communication card is configured to add the predetermined delay time by a buffer different from the reception buffer and the transmission buffer.

20. The communication system according to claim 15, further comprising:

a synchronization circuit coupled to a subsequent stage of the second communication card and configured to receive the pulse signal after the branch pulse signal was generated therefrom and execute time synchronization processing.

* * * * *